(12) United States Patent
Nakagawa

(10) Patent No.: US 6,762,891 B2
(45) Date of Patent: Jul. 13, 2004

(54) OPTICAL PICKUP DEVICE

(75) Inventor: Ryotaro Nakagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/453,518

(22) Filed: Jun. 4, 2003

(65) Prior Publication Data

US 2003/0231411 A1 Dec. 18, 2003

(30) Foreign Application Priority Data

Jun. 17, 2002 (JP) .................................. P2002-176062

(51) Int. Cl.[7] .............................................. G02B 7/02
(52) U.S. Cl. .................... 359/824; 359/823; 359/814
(58) Field of Search ............................... 359/823, 824, 359/813, 814, 819; 369/44.14

(56) References Cited

U.S. PATENT DOCUMENTS

| | | | | |
|---|---|---|---|---|
| 5,508,851 A | * | 4/1996 | Tachizawa | 359/822 |
| 5,703,730 A | * | 12/1997 | Yomoda | 359/824 |
| 5,850,313 A | * | 12/1998 | Miyagi et al. | 359/813 |
| 5,878,017 A | * | 3/1999 | Ikegame | 369/219 |
| 6,034,940 A | * | 3/2000 | Lee | 369/244 |
| 6,625,091 B2 | * | 9/2003 | Obara | 369/44.14 |

FOREIGN PATENT DOCUMENTS

| | | |
|---|---|---|
| JP | 9-320060 | 12/1997 |
| JP | 2001-319342 | 11/2001 |

* cited by examiner

*Primary Examiner*—Ricky Mack
(74) *Attorney, Agent, or Firm*—Morgan, Lewis & Bockius LLP

(57) ABSTRACT

In an optical pickup device, an upper plate portion, leg portions and a support shaft are provided in a base member so as to be disposed above a lens holder. A mechanism for adjusting the tilt angle of an objective lens is constituted by lower end surfaces formed out the curved surfaces of the leg portions, and reception surfaces formed out of the valley-like surfaces of an optical chassis. An electromagnetic drive mechanism for the lens holder includes the leg portions, magnets, and coils of the lens holder.

5 Claims, 7 Drawing Sheets

PROIR ART

OPTICAL PICKUP DEVICE

BACKGROUND OF THE INVENTION

1. Field of the Invention

The present invention relates to an optical pickup device for recording or reproducing signals in a disk such as a compact disk (CD), a minidisk (MD) or a digital versatile disk (DVD)

2. Description of the Related Art

An optical pickup device includes a lens holder, a base member, an optical chassis, a tilt angle adjusting mechanism, a cover, a first stopper and a second stopper. An objective lens is attached to the lens holder. The base member holds the lens holder and has an electromagnetic drive mechanism for driving the lens holder in a focusing direction and in a tracking direction. A light-emitting device and a light-receiving device are attached to the optical chassis. The tilt angle adjusting mechanism couples the base member with the optical chassis and has a function of adjusting the tilt angle of the objective lens. The cover encloses the lens holder and has an opening for exposing the objective lens therefrom. The first stopper limits the movable range of the lens holder in the focusing direction. The second stopper limits the movable range of the lens holder in the tracking direction.

FIG. 7 is a schematic perspective view showing the optical chassis and so on for use in such an optical pickup device in the related art. FIG. 8 is an exploded perspective view showing the base member, the lens holder and the cover. FIG. 9 is an explanatory view of the main portion of the tilt angle adjusting mechanism. FIG. 10 is a schematic longitudinal sectional front view of the same device.

An optical chassis 10 in FIG. 7 is reciprocated in the radial direction of a disk along a not-shown guide shaft. In the optical chassis 10, a frame portion 12 is formed like a rib so as to enclose a beam passage port 11. A mounting screw insertion hole 13a is provided at a place in the front end portion of the frame portion 12, and adjustment screw insertion holes 13b and 13b are provided at two (left and right) places in the rear end portion of the frame portion 12. The reference numeral 14a represents a mounting screw, and 14b represents an adjustment screw. A coil spring 14 can be fitted to the mounting screw 14a. In addition, reception surfaces 15 of flat slopes are formed at three places of the frame portion 12 so as to fall away toward the inside of the optical chassis 10.

A base member 20 in FIG. 8 has threaded holes 23a and 23b in the lower plate portion 22 having the beam passage port 21. The threaded hole 23a is disposed at one place on the front side of the lower plate portion 22 while the threaded holes 23b are disposed at two (left and right) places on the rear side thereof (one of the threaded holes on the rear side is not shown in the drawing). In addition, protrusions 25 each having an end surface formed into a curved surface are disposed at other three places. Further, the base member 20 has a pair of upright piece portions 24 and 24, a support shaft 26 and a pair of protruding portions 27 and 27. The pair of upright piece portions 24 and 24 are disposed symmetrically to extend upward from the width-direction opposite sides of the lower plate portion 22. The support shaft 26 extends upward from the lower plate portion 22. The pair of protruding portions 27 and 27 are disposed on the opposite sides of the support shaft 26 so as to put the support shaft 26 there between. Magnets 28 are disposed to overlap the inner surfaces of the pair of upright piece portions 24 and 24 respectively.

A lens holder 40 in FIG. 8 has an objective lens 41 and coils 42 and 43, which are disposed on the left and right opposite sides and the lower side of the objective lens 41 respectively. Then, a hole 44 provided in the lens holder 40 is fitted to the support shaft 26 of the base member 20 slidably axially and rotatably circumferentially, and openings 45 and 45 on the opposite sides of the hole 44 are loosely fitted to the protruding portions 27 and 27 of the base member 20 respectively. In addition, the lens holder 40 includes a not-shown magnetic substance. The magnetic substance suffers the attraction effect of the magnets 28 and 28 on the left and right sides of the base member 20 so that the lens holder 40 can be held floating in an axially intermediate portion of the support shaft 26.

A cover 50 in FIG. 8 is attached to the optical chassis 10 (see FIG. 7) coupled with the base member 20 mounted with the lens holder 40. Thus, the cover 50 encloses the lens holder 40. In addition, the cover 50 has an opening 51 for exposing the objective lens 41 therefrom.

In the optical pickup device obtained by installing the optical chassis 10, the base member 20, the lens holder 40 and the cover 50 as shown in FIGS. 7 and 8, the electromagnetic drive mechanism for driving the lens holder 40 in the focusing direction and the tracking direction includes the pair of upright piece portions 24 and 24 and the magnets 28 and 28 of the base member 20 having a function as a yoke, and the coils 42 and 43 provided in the lens holder 40.

On the other hand, the tilt angle adjusting mechanism having a function of adjusting the tilt angle of the objective lens includes the mounting screw 14a to which the coil spring 14 has been fitted, the adjustment screws 14b and 14b, the mounting screw insertion hole 13a and the adjustment screw insertion holes 13b and 13b of the optical chassis 10 and the threaded holes 23a and 23b of the base member 20 forming screw fixation portions, the reception surfaces 15 of the optical chassis 10 and the protrusions 25 of the base member 20. The base member 20 is coupled with the optical chassis 10 by the tilt angle adjusting mechanism. To adjust the tilt angle of the objective lens by means of the tilt angle adjusting mechanism, the mounting screw 14a having the coil spring 14 fitted thereto is inserted into the mounting screw insertion hole 13a of the optical chassis 10 from below, and screwed down to the threaded hole 23a of the base member 20 as shown in FIG. 10. In addition, the adjustment screws 14b are inserted into the adjustment screw insertion holes 13b of the optical chassis 10 from below, and screwed down to the threaded holes 23b of the base member 20. Thus, the three protrusions 25 of the base members 20 overlap the three inclined reception surfaces 15 of the optical chassis 10 respectively. An overlapping surface 25a of each protrusion 25 with the corresponding reception surface 15 is a curved surface as shown in FIG. 9. Accordingly, when the two adjustment screws 14b screwed down to the threaded holes 13b are rotated forward or backward, the base member 20 is swung around two axes perpendicularly to each other. Thus, it is possible to adjust the tilt angle of the objective lens 41 in the lens holder 40 held by the base member 20.

As can be understood from FIG. 10, the movable range of the lens holder 40 in the focusing direction is limited by a first stopper 61 constituted by a stopper surface 29 formed out of the upper surface of the lower plate portion 22 of the base member 20 and the inner surface of the cover 50. That is, the lens holder 40 can be displaced in the focusing direction between the position where the lens holder 40 abuts against the stopper surface 61 and the position where the lens holder 40 abuts against the inner surface of the cover

50. On the other hand, the movable range of the lens holder 40 in the tracking direction is limited by a second stopper constituted by the protruding portions 27 of the base member 20 which can engage with the opening walls of the openings 45 of the lens holder 40. That is, the lens holder 40 can be displaced in the tracking direction between the position where the opening walls of the openings 45 abut against one-side ends of the protruding portions 27 and the position where the opening walls of the openings 45 abut against the other-side ends of the protruding portions 27.

In the related-art optical pickup device described above, the cover 50 serves not only to prevent dust from invading the place where the lens holder 40 is disposed, but also to prevent the interference of the objective lens 41 with other parts from occurring when the lens holder 40 is displaced in the focusing direction or the tracking direction or when the optical pickup device as a whole moves in the radial direction of the disk. In addition, the cover 50 serves to prevent any hand from touching the objective lens 41 and so on during the process of installing the optical pickup device into a set.

JP-A-2001-319342 (Precedent 1) also discloses an optical pickup, showing a cover having a function similar to that of the cover 50 described in the related art.

JP-A-9-320060 (Precedent 2) also discloses an optical pickup device, in which an actuator base movable in the radial direction of a disk is provided with a tall protective circumferential wall, and an actuator (such as a lens holder) supporting an objective lens is received in a space surrounded by the circumferential wall so as to attain a function substantially similar to that of the cover 50 described in the related art.

However, in the optical pickup device described in the related art, the lower plate portion 22 of the base member 20 having a function as a yoke overlaps the optical chassis 10 as shown in FIG. 10. Thus, not only does the lens holder 40 held by the base member 20 have to be covered from above with the cover 50 so that the lens holder 40 is enclosed by the cover 50, but the volume of the device as a whole also increases correspondingly to the thickness of the lower plate portion 22. This results in an obstacle to making the device small and compact. In addition, the movable range of the lens holder 40 in the focusing direction is limited by the first stopper 61 formed out of the stopper surface 29 of the base member 20 and the inner surface of the cover 50. This also results in an obstacle to making the device small and compact. The same thing applies to the optical pickup in Precedent 1.

On the other hand, the optical pickup device in Precedent 2 has a configuration in which the actuator is surrounded by the tall protective circumferential wall provided in the actuator base. Thus, it is indeed easy to make the device small and compact. But there is no member covering the top of the actuator in this device. The actuator is therefore exposed upward. As a result, it is difficult to obtain a satisfactory function for preventing the interference between the actuator and other parts.

SUMMARY OF THE INVENTION

The present inventor paid attention to the circumstances that the related art or Precedents face, and discovered that the base member could have a function as a cover when the base member was designed to have a shape which was obtained by turning the shape of the base member shown in FIG. 8 upside down. In addition, the inventor had an idea that such a design prevented the lower plate portion of the base member from overlapping the optical chassis, so that it would be easy to make the device small and compact correspondingly.

The invention was developed in such a context. It is an object of the invention to provide an optical pickup device in which a base member is fundamentally designed to have a shape obtained by turning the related-art base member upside down, and a tilt angle adjustment mechanism is provided in the base member designed thus and an optical chassis.

It is another object of the invention to provide an optical pickup device in which a base member is designed to have a shape obtained by turning the related-art base member upside down, so that the base member can have a function equal to that of the cover used in the related art.

According to the invention, there is provided an optical pickup device including: a lens holder having an objective lens; a base member holding the lens holder and having an electromagnetic drive mechanism for driving the lens holder in a focusing direction and in a tracking direction; an optical chassis; a tilt angle adjusting mechanism coupling the base member with the optical chassis and having a function of adjusting a tilt angle of the objective lens; a first stopper for limiting a movable range of the lens holder in the focusing direction; and a second stopper for limiting a movable range of the lens holder in the tracking direction, wherein the base member includes an upper plate portion and leg portions to enclose the lens holder instead of a cover, the upper plate portion having a hole for exposing the objective lens therefrom and being disposed above the lens holder, the leg portions extending downward from the upper plate portion, and wherein the tilt angle adjusting mechanism includes screw fixation portions provided at a plurality of places of the base member and the optical chassis so as to be screwed to each other, and reception surfaces provided in the optical chassis for receiving the lower end surfaces of the leg portions swingably around two axes perpendicular to each other.

With such a configuration, the lens held by the base member is covered, from above, with the upper plate portion of the base member. Thus, the base member has a function of preventing dust from invading the place where the lens holder 40 is disposed, a function of preventing the objective lens 41 from interfering with other parts when the lens holder is displaced in the focusing direction or the tracking direction or when the optical pickup device as a whole moves in the radial direction of the disk, and a function of preventing any hand from touching the objective lens and so on during the process of installing the optical pickup device into a set. In other words, the base member has not only its essential function of holding the lens holder but also a function as a cover used in the related art. Thus, even if the cover is omitted and the number of parts is reduced, a function equal to the function exerted by the cover used in the related art can be exerted by the base member. In addition, the tilt angle adjusting mechanism includes screw fixation portions provided at a plurality of places of the base member and the optical chassis so as to be screwed down to each other, and reception surfaces provided in the optical chassis and for receiving the lower end surfaces of the leg portions swingably around two axes perpendicular to each other. Thus, a function of adjusting the tilt angle of the objective lens at an equal level to that in the related art can be obtained.

According to the invention, preferably, the leg portions are disposed symmetrically on width-direction opposite sides of the upper plate portion, the lower end surfaces of the leg portions are formed into curved surfaces, and the reception surfaces are comprised of valley-shaped surfaces formed to fall away toward an inner side of the optical chassis. With such a configuration, the tilt angle adjusting mechanism can be formed easily, so that the optical pickup device can be designed so easily.

According to the invention, preferably, the first stopper is formed out of a lower stopper surface provided in the optical chassis to be positioned under the lens holder, and an upper stopper surface provided in the upper plate portion of the base member to be positioned above the lens holder, and the second stopper is provided in the base member. Since the movable range of the lens holder in the focusing direction is limited by the lower stopper surface of the optical chassis and the upper plate portion of the base member, it becomes easy to make the device smaller and more compact than in the related art.

According to the invention, preferably, the electromagnetic drive mechanism includes a pair of leg portions disposed symmetrically on width-direction opposite sides of the upper plate portion respectively, magnets disposed to overlap inner surfaces of the leg portions respectively, and coils provided in the lens holder. With such a configuration, the electromagnetic drive mechanism can be formed without changing the shape of the related-art base member on a large scale.

The invention is embodied when the following configuration is adopted. That is, an optical pickup device including: a lens holder having an objective lens; a base member holding the lens holder and having an electromagnetic drive mechanism for driving the lens holder in a focusing direction and in a tracking direction; an optical chassis; a tilt angle adjusting mechanism coupling the base member with the optical chassis and having a function of adjusting a tilt angle of the objective lens; a first stopper for limiting a movable range of the lens holder in the focusing direction; and a second stopper for limiting a movable range of the lens holder in the tracking direction, wherein the base member includes an upper plate portion, a pair of leg portions and a support shaft to enclose the lens holder instead of a cover, the upper plate portion having a hole for exposing the objective lens therefrom and being disposed above the lens holder, the pair of leg portions being disposed symmetrically to extend downward from width-direction opposite sides of the upper plate portion, the support shaft extending downward from the upper plate portion so as to support the lens holder slidably axially and rotatably circumferentially, wherein the tilt angle adjusting mechanism includes screw fixation portions provided at a plurality of places of the base member and the optical chassis so as to be screwed to each other, lower end surfaces of the leg portions formed into curved surfaces, and reception surfaces provided in the optical chassis for receiving the lower end surfaces of the leg portions swingably around two axes perpendicular to each other, the reception surfaces being comprised of valley-like surfaces formed to fall away toward an inner side of the optical chassis, wherein the electromagnetic drive mechanism includes the pair of leg portions, magnets disposed to overlap inner surfaces of the leg portions respectively, and coils provided in the lens holder; wherein the first stopper is formed out of a lower stopper surface provided in the optical chassis to be positioned under the lens holder, and an upper stopper surface provided in the upper plate portion of the base member to be positioned above the lens holder, and wherein the second stopper is formed out of a protruding portion extending downward from the upper plate portion of the base member so as to be inserted into the opening formed in the lens holder and engaged with an opening wall of the opening.

With this configuration, even when the related-art cover is omitted and the base member is designed to have a shape obtained by turning the related-art base member upside down, addition of another member in place of the cover can be prevented, so that the cover can be omitted and the number of parts in the device as a whole can be reduced.

DETAILED DESCRIPTION OF THE PREFFERED EMBODIMENTS

Figure 1:
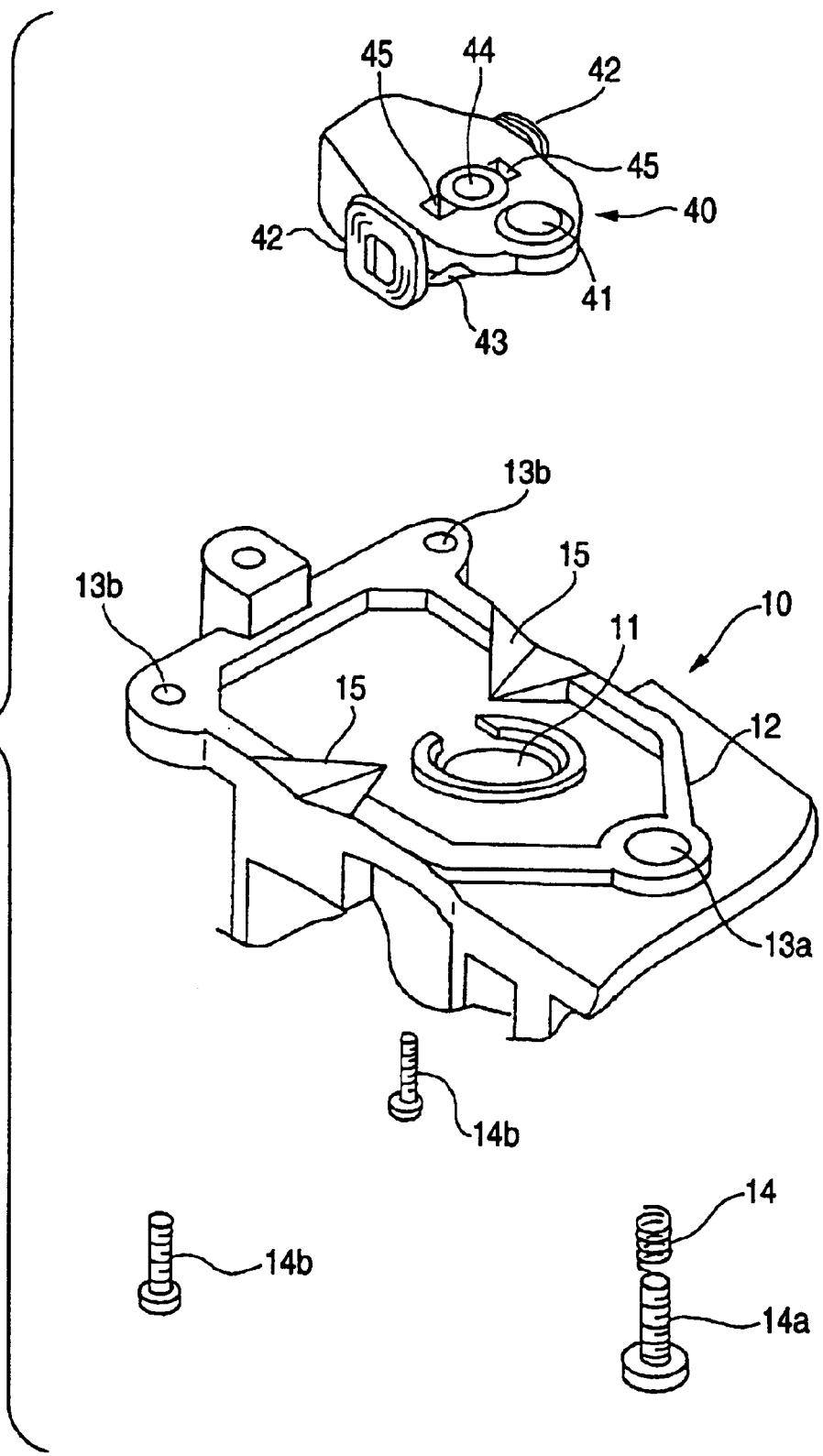
FIG. 1 is an exploded perspective view schematically showing an optical chassis, a lens holder, etc. for use in an optical pickup device according to an embodiment of the invention.
Figure 2:
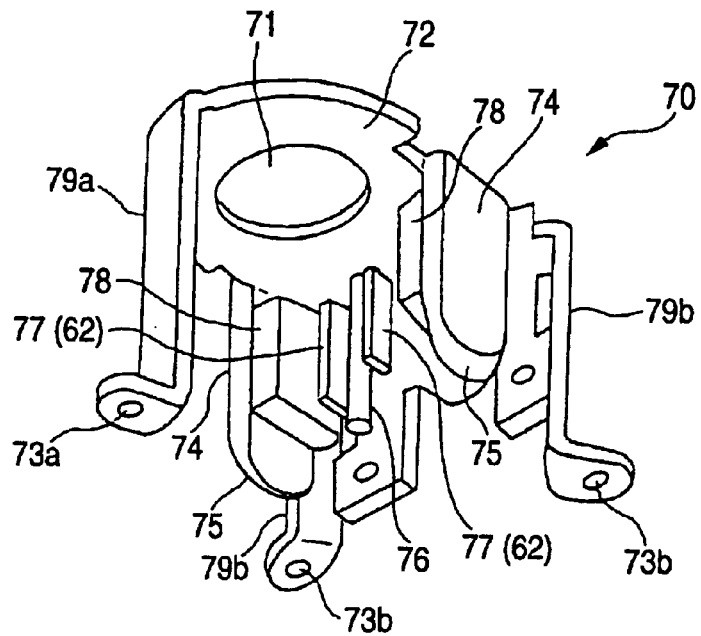
FIG. 2 is a schematic perspective view of a base member according to the embodiment, viewed from its oblique lower side.
Figure 3:
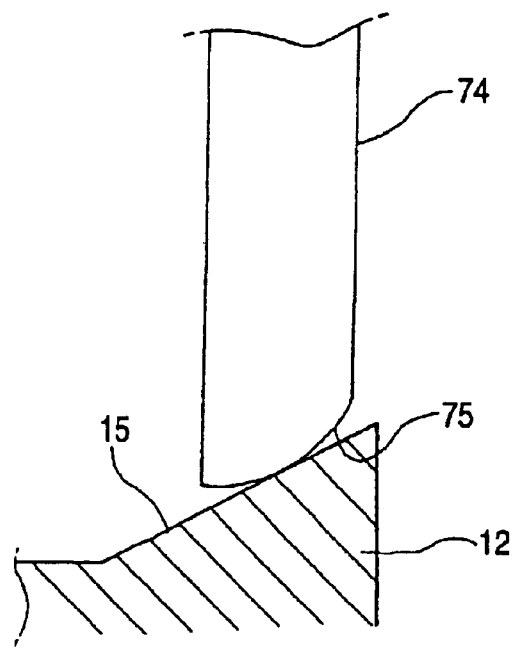
FIG. 3 is an explanatory view of a tilt angle adjusting mechanism according to the embodiment.
Figure 4:
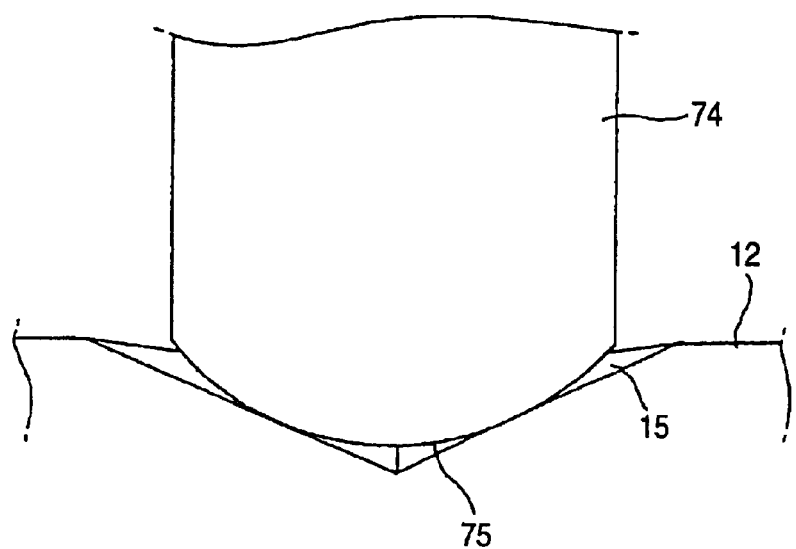
FIG. 4 is an explanatory view of the tilt angle adjusting mechanism.
Figure 5:
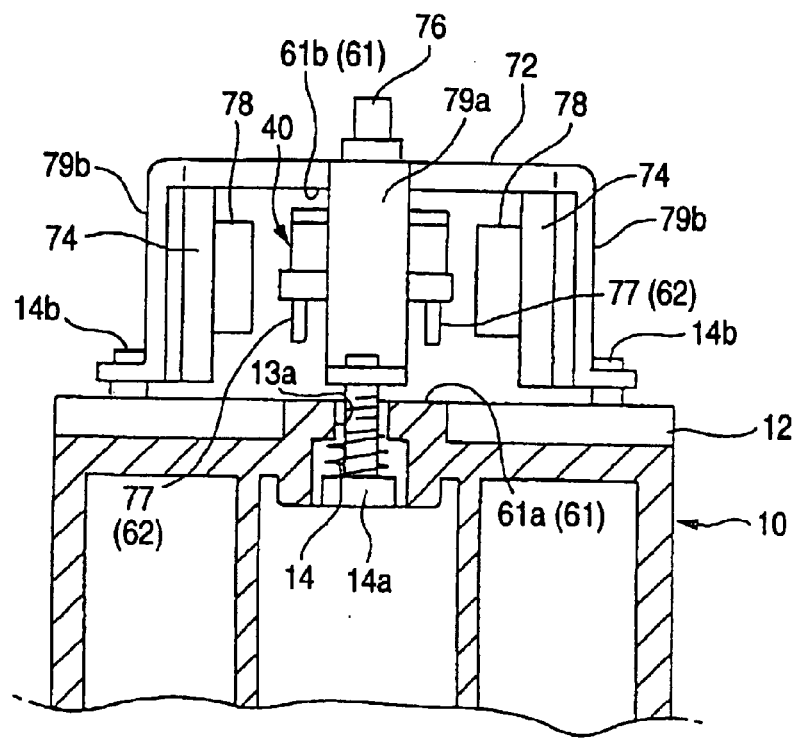
FIG. 5 is a longitudinally sectional front view schematically showing the optical pickup device.
Figure 6:
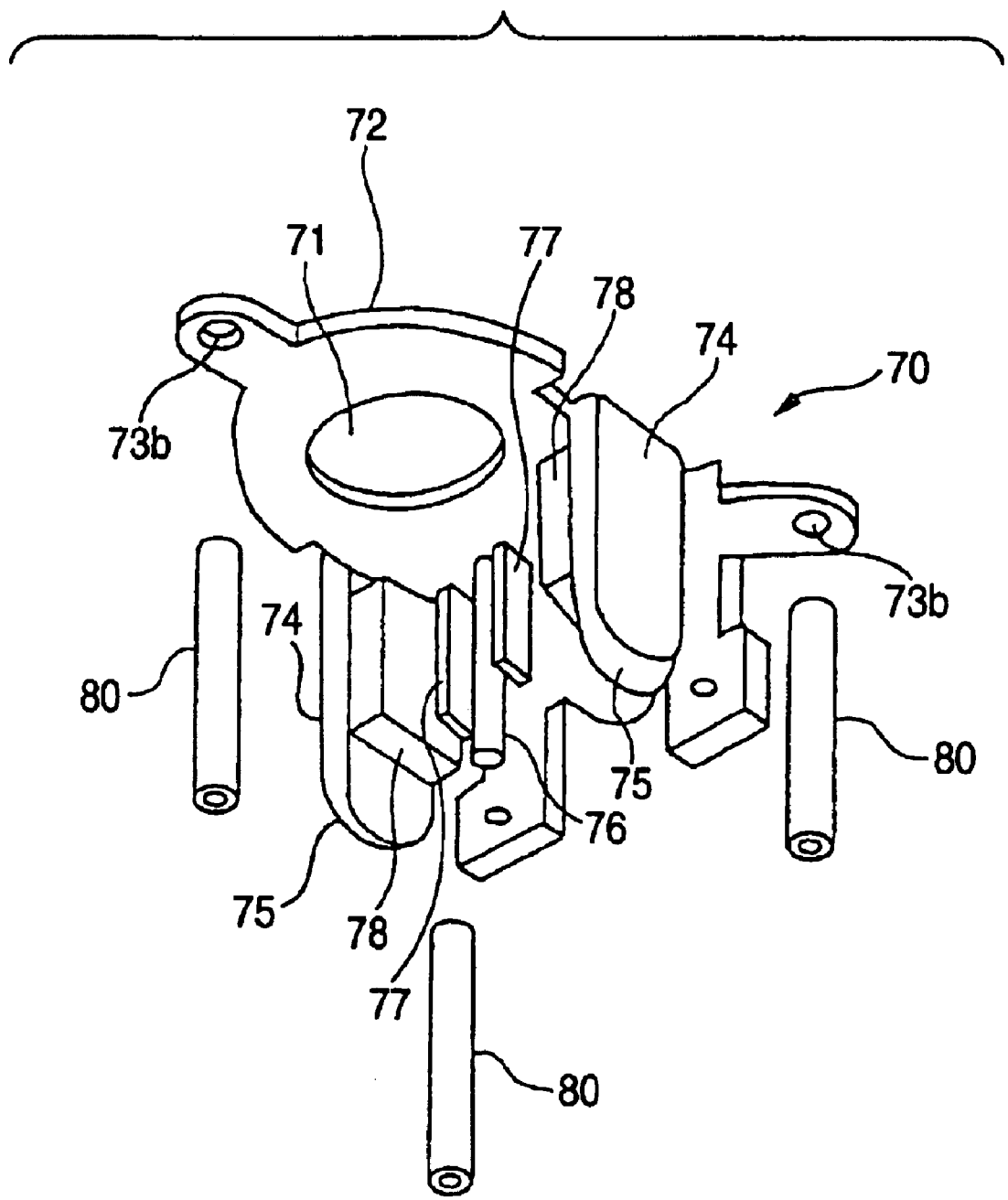
FIG. 6 is a schematically perspective view showing a base member according to a modification, viewed from its oblique lower side.

FIG. 1 is an exploded perspective view schematically showing an optical chassis 10, a lens holder 40, etc. for use in an optical pickup device according to an embodiment of the invention. FIG. 2 is a schematic perspective view of a base member 70 viewed from its oblique lower side. FIGS. 3 and FIG. 4 are explanatory views of a tilt angle adjusting mechanism. FIG. 5 is a longitudinally sectional front view schematically showing the optical pickup device. FIG. 6 is a schematic perspective view showing a base member 70 according to a modification from its oblique lower side.

Figure 7:
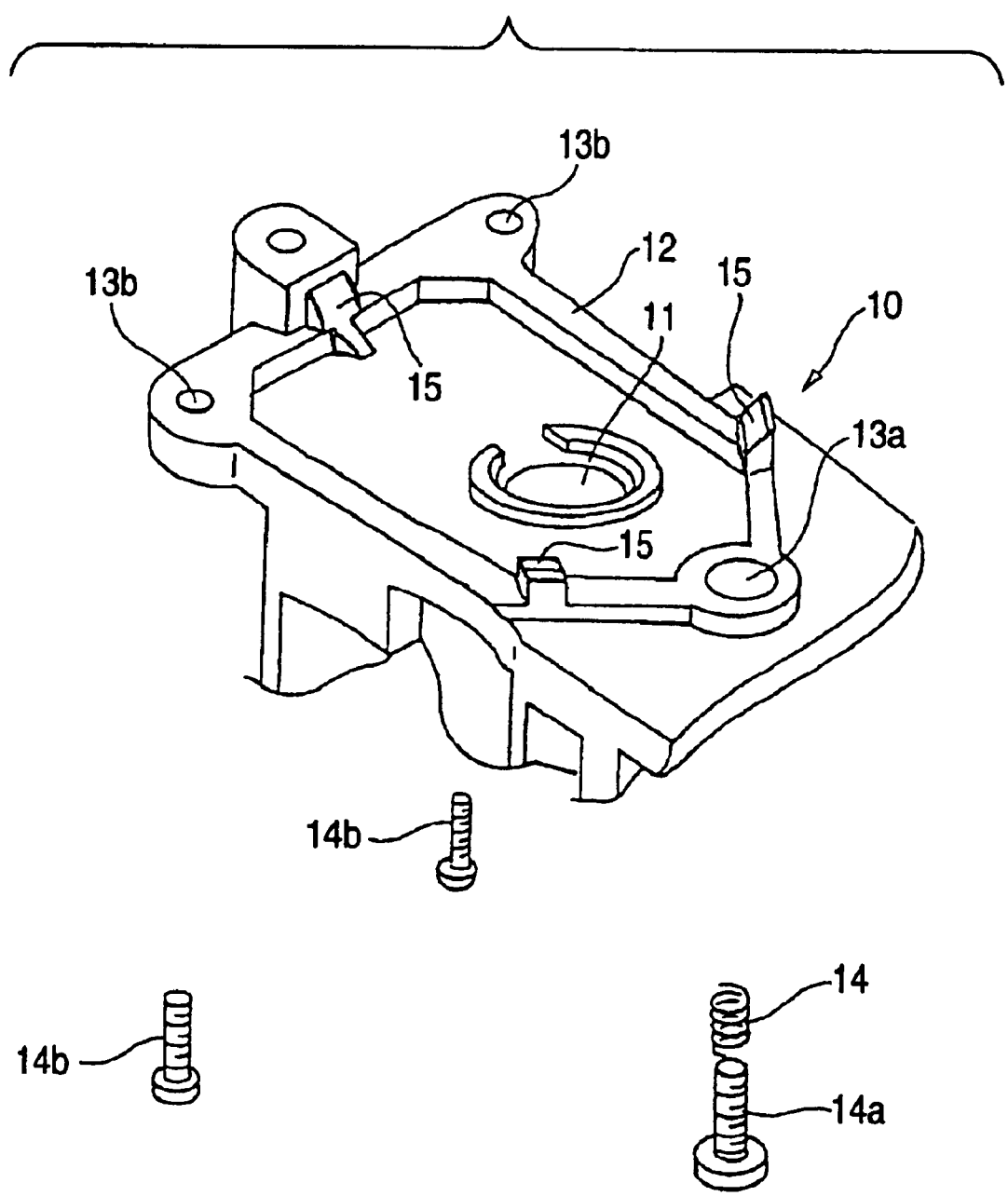
FIG. 7 is a schematic perspective view showing an optical chassis and so on for use in an optical pickup device in the related art.

The optical chassis 10 shown in FIG. 1 is reciprocated in the radial direction of a disk along a not-shown guide shaft. The optical chassis 10 has a configuration similar to that of the related-art optical chassis 10 described with reference to FIG. 7, except the shape of reception surfaces 15 provided in symmetric positions of a rib-like frame portion 12. A coil spring 14, amounting screw 14a and adjustment screws 14b adopted in this embodiment have the same configurations as those used in the related-art optical chassis 10 described with reference to FIG. 7. The lens holder 40 in FIG. 1 has the same configuration as that of the lens holder 40 described with reference to FIG. 8. Therefore, parts the same as those in the related art are denoted by the same reference numerals correspondingly, and duplicate description thereof will be avoided.

Each reception surface 15 provided in the optical chassis 10 in FIG. 1 is a valley-like surface formed to fall away toward the inside of the optical chassis 10.

Figure 8:
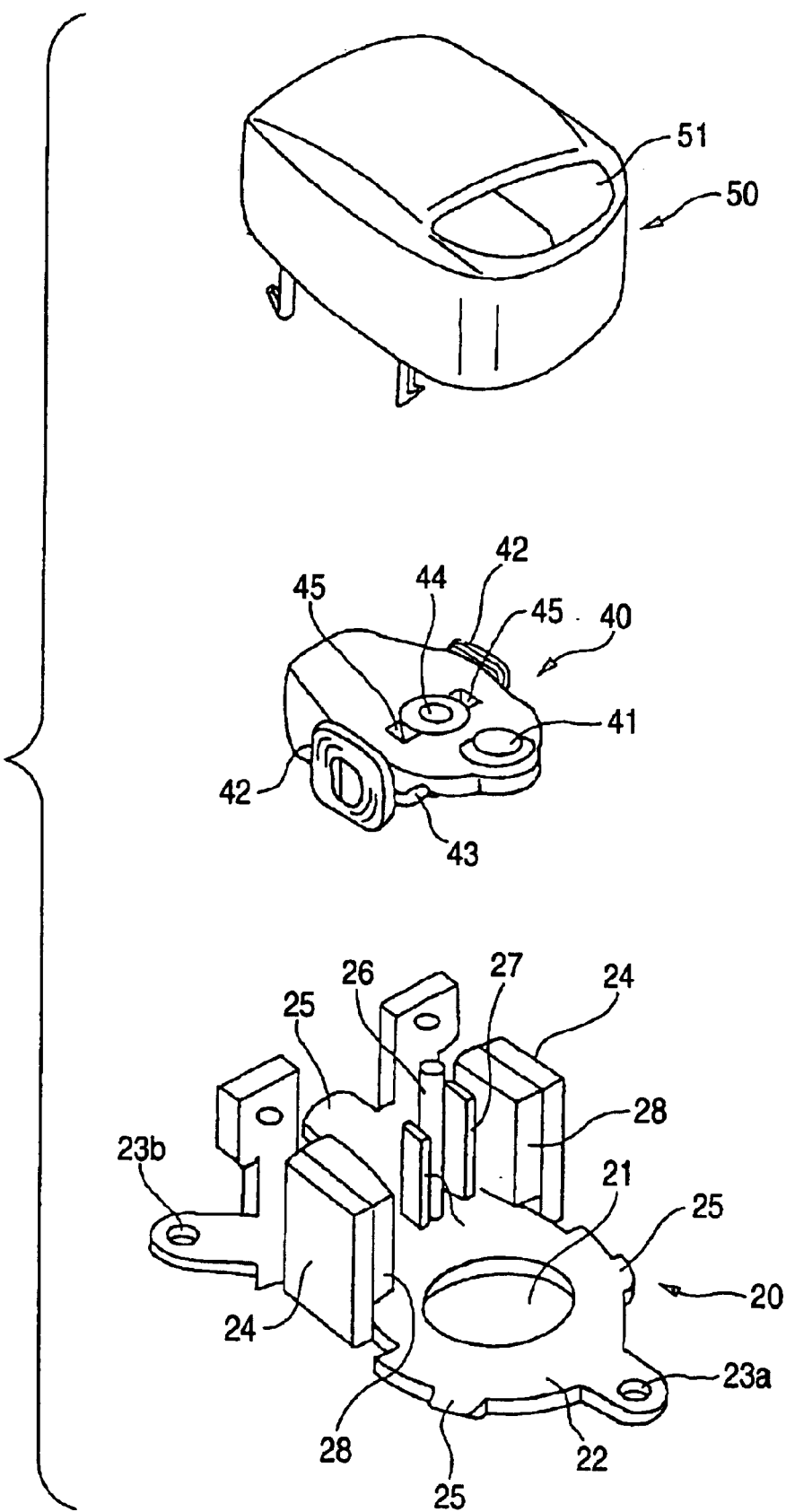
FIG. 8 is an exploded perspective view showing a base member, a lens holder and a cover in the optical pickup device in the related art.
Figure 9:
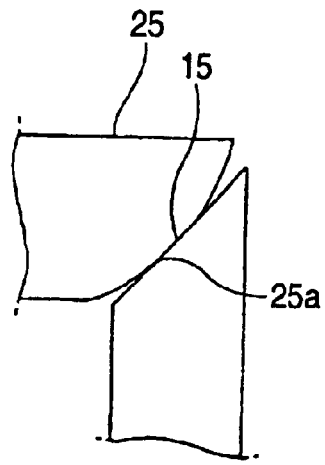
FIG. 9 is an explanatory view of the main portion of a tilt angle adjusting mechanism in the related art.
Figure 10:
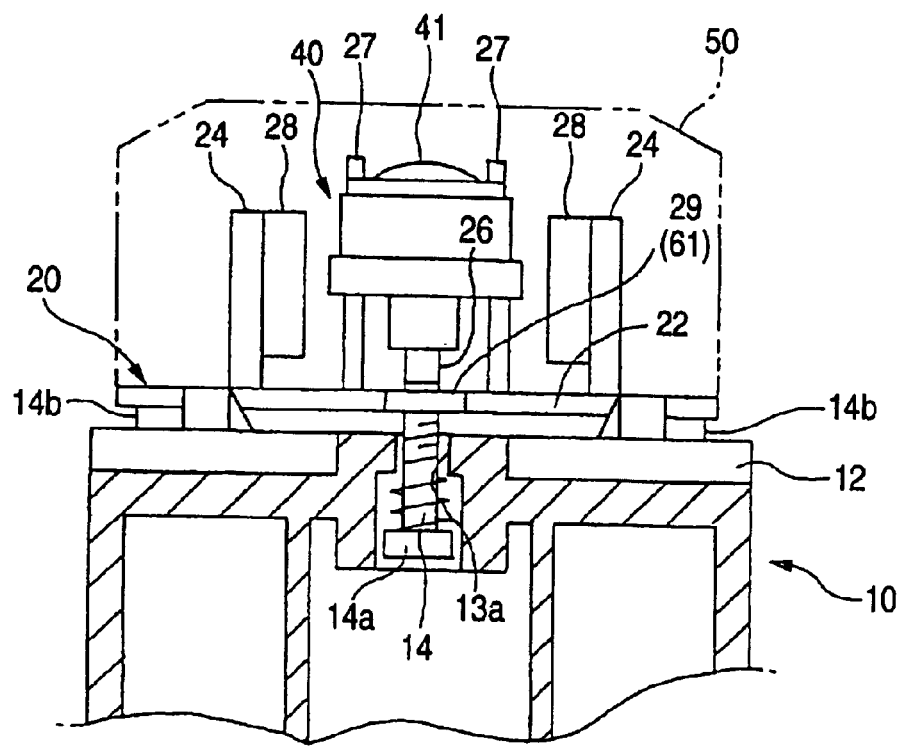
FIG. 10 is a schematic longitudinal sectional front view of the optical pickup device in the related art.

The base member 70 shown in FIG. 2 has a fundamental shape corresponding to a shape obtained by turning the related-art base member 20 described in FIG. 8 upside down. That is, the base member 70 has drooping portions 79a and 79b at one place in the front end portion of the upper plate portion 72 having a beam passageway hole 71 and at two (left and right) places in a rear end portion of the upper plate portion 72. The drooping portions 79a and 79b extend downward respectively. The lower ends of the drooping portions 79a and 79b are bent outward, and threaded holes 73a and 73b are provided therein. In addition, the base member 70 has a pair of leg portions 74 and 74, a support shaft 76 and a pair of protruding portions 77 and 77. The pair of leg portions 74 and 74 are disposed symmetrically to extend downward from width-direction opposite sides of the upper plate portion 72. The support shaft 76 extends downward from the upper plate portion 72. The pair of protruding portions 77 and 77 are disposed on the opposite sides of the support shaft 76 so as to put the support shaft 76 there between. Magnets 78 and 78 are disposed to overlap the inner surfaces of the pair of leg portions 74 and 74 respectively.

The base member 70 has a shape corresponding to the shape obtained by turning the base member 20 described in FIG. 8 upside down. That is, the beam passage port 71, the upper plate portion 72, the threaded holes 73a and 73b, the leg portions 74, the support shaft 76, the protruding portions 77 and the magnets 78 of the base member 70 correspond to the beam passage port 21, the lower plate portion 22, the threaded holes 23a and 23b, the upright piece portions 24, the support shaft 26, the protruding portions 27 and the magnets 28 respectively in the case where the base member 20 described in FIG. 8 has been turned upside down. Incidentally, the protrusions 25 provided in the base member 20 in FIG. 8 are omitted in the base member 70 in FIG. 2. In place of the protrusions 25, a lower end surface 75 of each leg portion 74 is formed into a curved surface. That is, the lower end surface 75 of each leg portion 74 is formed into an arcuate shape in side view as shown in FIG. 4, and formed into a curved shape in front view as shown in FIG. 3.

The lens holder 40 shown in FIG. 1 is held by the base member 70 in FIG. 2. That is, the support shaft 76 of the base member 70 is fitted to a hole 44 of the lens holder 40 slidably axially and rotatably circumferentially, and openings 45 and 45 on the opposite sides of the hole 44 are loosely fitted to the protruding portions 77 and 77 of the base member 70 respectively. In addition, the lens holder 40 includes a magnetic substance (not-shown). The magnetic substance suffers the attraction effect of the magnets 78 and 78 on the left and right sides of the base member 70 so that the lens holder 40 can be held floating in an axially intermediate portion of the support shaft 76. The electromagnetic mechanism for driving the lens holder 40 in the focusing direction and the tracking direction includes the pair of leg portions 74 and 74 and the magnets 78 and 78 of the base member 70 having a function as a yoke, and coils 42 and 43 provided in the lens holder 40.

The tilt angle adjusting mechanism having a function of adjusting the tilt angle of the objective lens 41 includes the mounting screw 14a to which the coil spring 14 has been fitted as shown in FIG. 1, the adjustment screws 14b and 14b, the mounting screw insertion hole 13a and the adjustment screw insertion holes 13b and 13b of the optical chassis 10 and the threaded holes 73a and 73b of the base member 70 forming screw fixation portions as shown in FIG. 2, the reception surfaces 15 of the optical chassis 10 and the lower end surfaces 75 of the leg portions 74 of the base member 70. The base member 70 is coupled with the optical chassis 10 by the tilt angle adjusting mechanism. To adjust the tilt angle of the objective lens by means of the tilt angle adjusting mechanism, the mounting screw 14a having the coil spring 14 fitted thereto is inserted into the mounting screw insertion hole 13a of the optical chassis 10 from below, and screwed to the threaded hole 73a of the base member 70 as shown in FIG. 5. In addition, the adjustment screws 14b are inserted into the adjustment screw insertion holes 13b of the optical chassis 10 from below, and screwed to the threaded holes 73b of the base member 70. Thus, the lower end surfaces 75 of the left and right leg portions 74 of the base member 70 overlap the two reception surfaces 15 of the optical chassis 10 respectively. In the places where the reception surfaces 15 overlap the lower end portions 75 of the leg portions 74, the leg portions 74 can slide on the reception surfaces 15 and swing in directions of two axes perpendicular to each other, as shown in FIGS. 3 and 4. When the two adjustment screws 14b screwed to the threaded holes 13b are rotated forward or backward, the base member 70 swings to adjust the tilt angle of the objective lens 41 in the lens holder 40 held by the base member 70.

As can be understood from FIG. 5, a first stopper 61 for limiting the movable range of the lens holder 40 in the focusing direction is constituted by a lower stopper surface 61a formed out of the upper surface of the optical chassis 10 to be positioned under the lens holder 40, and an upper stopper surface 61b formed out of the lower surface of the upper plate portion 72 of the base member 70 to be positioned above the lens holder 40. Accordingly, the lens holder 40 can be displaced in the focusing direction between the position where the lens holder 40 abuts against the lower stopper surface 61a and the position where the lens holder 40 abuts against the upper stopper surface 61b. On the other hand, the movable range of the lens holder 40 in the tracking direction is limited by a second stopper 62 formed out of the protruding portions 77 of the base member 70. That is, the lens holder 40 can be displaced in the tracking direction between the position where the opening walls of the openings 45 abut against one-side ends of the protruding portions 77 and the position where the opening walls of the openings 45 but against the other-side ends of the protruding portions 77.

In the optical pickup device described above, the upper plate portion 72 of the base member 70 is disposed above the lens holder 40, and the objective lens 41 is exposed from the beam passage port 71 of the upper plate portion 72. Accordingly, the upper plate portion 72 serves not only to prevent dust from invading the place where the lens holder 40 is disposed, but also to prevent the interference of the objective lens 41 with other parts from occurring when the lens holder 40 is displaced in the focusing direction or the tracking direction or when the optical pickup device as a whole moves in the radial direction of the disk. In addition, any hand is also prevented from touching the objective lens 41 and so on during the process of installing the optical pickup device into a set. In such a manner, the upper plate portion 72 of the base member 70 can fulfill a function as the cover 50 used in the related art. Thus, it is not necessary to use the cover 50. In addition, the base member 70 can be designed easily because the fundamental shape of the base member 70 corresponds to the shape obtained by turning the related-art base member 20 upside down.

In the base member 70 shown in FIG. 2, the threaded holes 73a and 73b are provided in the drooping portions 79a and 79b contiguous to one place of the front end portion of the upper plate portion 72 and two (left and right) places of the rear end portion of the upper plate portion 72 respectively. In terms of this point, however, threaded holes formed by turning the related-art base member 20 upside down may be used as they are. FIG. 6 shows such a case by way of example. That is, in the case of FIG. 6, the threaded holes formed by turning the related-art base member 20 upside down are provided as they are. With this configuration, the threaded holes 73a and 73b are positioned at a distance from above the mounting screw insertion hole 13a and the adjustment screw insertion holes 13b of the optical chassis 10 respectively when the base member 70 is mounted on the optical chassis 10 through the leg portions 74. It will therefore go well if those gaps are filled with spacers 80.

As described above, according to the invention, there is provided a base member whose fundamental shape is a shape obtained by turning the related-art base member upside down. The base member has not only its essential function of holding a lens holder but also a function as the cover used in the related art. Thus, the base member exerts a function equal to the function of the cover used in the related art even when the cover is omitted and the number of parts is reduced for reduction in cost. Accordingly, dust is prevented from invading the place where the lens holder is disposed, and the interference of the objective lens with other parts is also prevented from occurring when the lens holder is displaced in the focusing direction or the tracking direction or when the optical pickup device as a whole moves in the radial direction of a disk. Further, any hand is also prevented from touching the objective lens and so on during the process of installing the optical pickup device into a set. In addition, the base member 70 can be designed easily.

In addition, the tilt angle adjusting mechanism includes screw fixation portions provided at a plurality of places of the base member and the optical chassis so as to be screwed down to each other, and reception surfaces provided in the optical chassis and for receiving the lower end surfaces of the leg portions swingably around two axes perpendicular to each other. Thus, a function of adjusting the tilt angle of the objective lens at an equal level to that in the related art can be obtained.

What is claimed is:

1. An optical pickup device comprising:
    a lens holder having an objective lens;
    a base member holding the lens holder and having an electromagnetic drive mechanism for driving the lens holder in a focusing direction and in a tracking direction;
    an optical chassis;
    a tilt angle adjusting mechanism coupling the base member with the optical chassis and having a function of adjusting a tilt angle of the objective lens;
    a first stopper for limiting a movable range of the lens holder in the focusing direction; and
    a second stopper for limiting a movable range of the lens holder in the tracking direction,
    wherein the base member includes an upper plate portion, a pair of leg portions and a support shaft to enclose the lens holder instead of a cover, the upper plate portion having a hole for exposing the objective lens there from and being disposed above the lens holder, the pair of leg portions being disposed symmetrically to extend downward from width-direction opposite sides of the upper plate portion, the support shaft extending downward from the upper plate portion so as to support the lens holder slidably axially and rotatably circumferentially,
    the tilt angle adjusting mechanism includes screw fixation portions provided at a plurality of places of the base member and the optical chassis so as to be screwed to each other, lower end surfaces of the leg portions formed into curved surfaces, and reception surfaces provided in the optical chassis for receiving the lower end surfaces of the leg portions swingably around two axes perpendicular to each other, the reception surfaces being comprised of valley-like surfaces formed to fall away toward an inner side of the optical chassis,
    the electromagnetic drive mechanism includes the pair of leg portions, magnets disposed to overlap inner surfaces of the leg portions respectively, and coils provided in the lens holder,
    the first stopper is formed out of a lower stopper surface provided in the optical chassis to be positioned under the lens holder, and an upper stopper surface provided in the upper plate portion of the base member to be positioned above the lens holder, and
    the second stopper is formed out of a protruding portion extending downward from the upper plate portion of the base member so as to be inserted into an opening formed in the lens holder and engaged with an opening wall of the opening.

2. An optical pickup device comprising:
    a lens holder having an objective lens;
    a base member holding the lens holder and having an electromagnetic drive mechanism for driving the lens holder in a focusing direction and in a tracking direction;
    an optical chassis;
    a tilt angle adjusting mechanism coupling the base member with the optical chassis and having a function of adjusting a tilt angle of the objective lens;
    a first stopper for limiting a movable range of the lens holder in the focusing direction; and
    a second stopper for limiting a movable range of the lens holder in the tracking direction,
    wherein the base member includes an upper plate portion and leg portions to enclose the lens holder instead of a cover, the upper plate portion having a hole for exposing the objective lens therefrom and being disposed above the lens holder, the leg portions extending downward from the upper plate portion, and
    the tilt angle adjusting mechanism includes screw fixation portions provided at a plurality of places of the base member and the optical chassis so as to be screwed to each other, and reception surfaces provided in the optical chassis for receiving the lower end surfaces of the leg portions swingably in directions of two axes perpendicular to each other.

3. The optical pickup device according to claim 2, wherein the leg portions are disposed symmetrically on width-direction opposite sides of the upper plate portion, the lower end surfaces of the leg portions are formed into curved surfaces, and the reception surfaces are comprised of valley-shaped surfaces formed to fall away toward an inner side of the optical chassis.

4. The optical pickup device according to claim 2, wherein the first stopper is formed out of a lower stopper surface provided in the optical chassis to be positioned under the lens holder, and an upper stopper surface provided in the upper plate portion of the base member to be positioned above the lens holder, and the second stopper is provided in the base member.

5. The optical pickup device according to claim 2, wherein the electromagnetic drive mechanism includes a pair of leg portions disposed symmetrically on width-direction opposite sides of the upper plate portion respectively, magnets disposed to overlap inner surfaces of the leg portions respectively, and coils provided in the lens holder.

* * * * *